United States Patent [19]
Ahuja

[11] Patent Number: 6,157,529
[45] Date of Patent: Dec. 5, 2000

[54] BASIC SURGE PROTECTOR

[76] Inventor: Om Ahuja, P.O. Box 741484, Houston, Tex. 77274-1484

[21] Appl. No.: 08/993,222

[22] Filed: Dec. 18, 1997

Related U.S. Application Data

[63] Continuation-in-part of application No. 08/606,865, Feb. 26, 1996, which is a continuation-in-part of application No. 08/448,992, May 24, 1995, which is a continuation-in-part of application No. 08/138,742, Oct. 18, 1993, Pat. No. 5,440,441, which is a continuation-in-part of application No. 08/008,674, Jan. 25, 1993, Pat. No. 5,428,494, which is a continuation-in-part of application No. 07/684,167, Apr. 11, 1991, abandoned, which is a continuation-in-part of application No. 06/833,360, Feb. 25, 1986, Pat. No. 5,388,022, which is a continuation-in-part of application No. 06/664,472, Oct. 10, 1984, abandoned.

[51] Int. Cl.[7] ...................................................... H02H 9/00
[52] U.S. Cl. .............................. 361/111; 361/56; 361/103; 361/118
[58] Field of Search .................................. 361/54, 56, 91, 361/111, 115, 103, 104, 117, 118, 127

[56] References Cited

U.S. PATENT DOCUMENTS 4,354,217  10/1982  Mahon ...................................... 361/104
4,587,588  5/1986  Goldstein .................................. 361/54

*Primary Examiner*—Jeffrey Gaffin
*Assistant Examiner*—Stephen Jackson

[57] ABSTRACT

The specification discloses a Basic Surge Protector for protecting an electrical equipment connected on its load side from spurious or excessive transient voltages or surges or both on an electrical line above a predetermined value, on its line side or its hot side. Intended for use in ac circuits, dc circuits and ac/dc circuits. A fuse is used to monitor a fault current flowing into a surge voltage suppression device, due to an excessive voltage across the suppression device. Thus the fuse blows resulting from an over-current condition, and it disables and opens a solid state switch or an electro mechanical switch mounted in series in the line thus protecting the secondary or the load side from over-voltages and transient surges on the electrical line. Circuits are also disclosed which provide for automatic setting and resetting after an over-voltage fault condition on the line being protected. The lightning and surge protection as provided by this invention may also be rendered into a single chip solid state device.

20 Claims, 5 Drawing Sheets

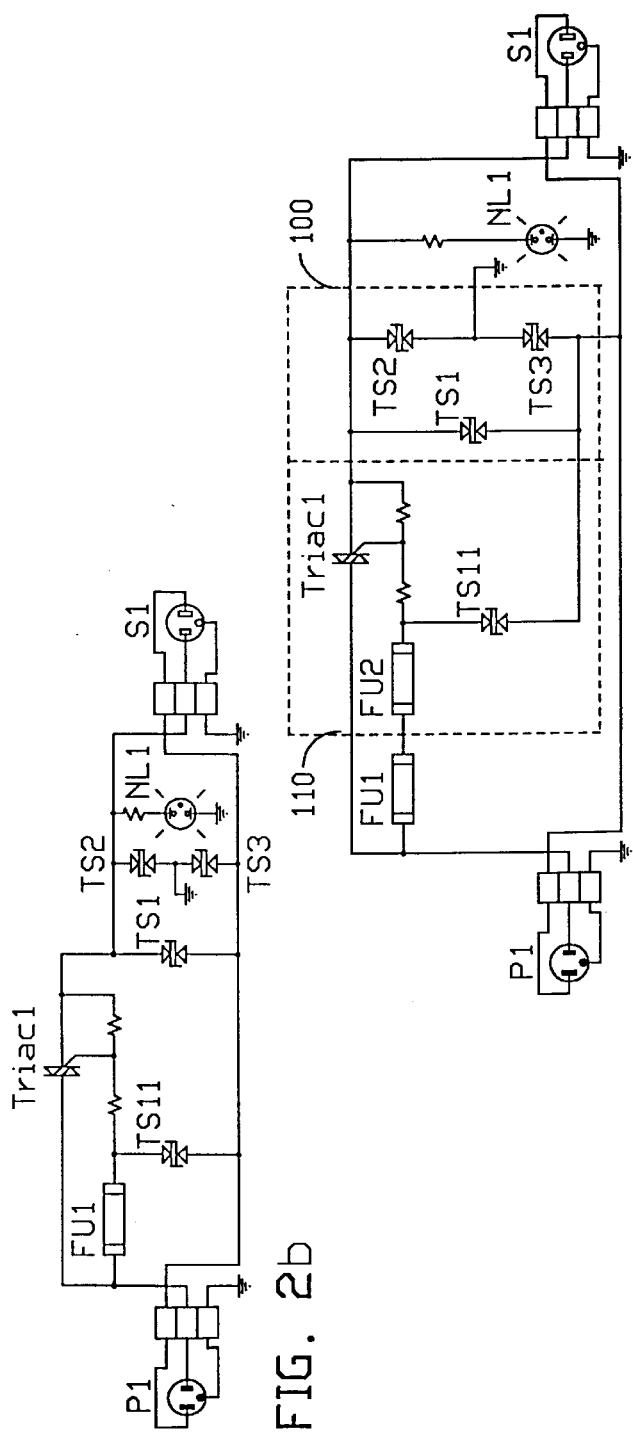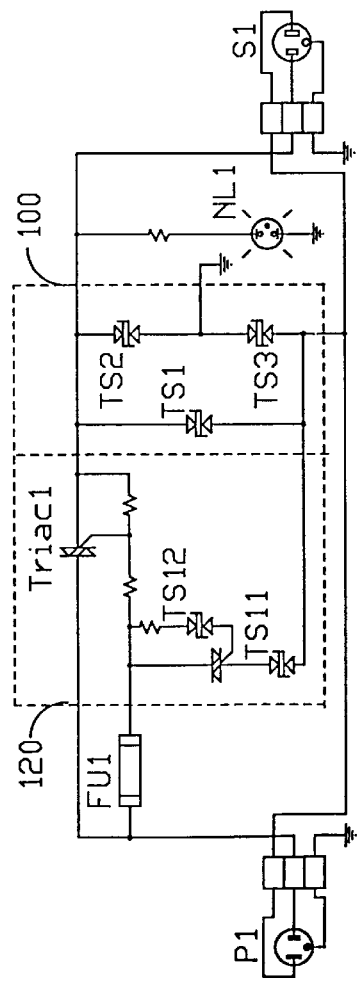
FIG. 2b
FIG. 2c
FIG. 2d

BASIC SURGE PROTECTOR

CROSS-REFERENCE TO RELATED APPLICATIONS

This application is a continuation-in-part of applicant's pending applications and issued applications: "AUTOMATIC DOOR BELL ANSWERING SYSTEM" filed Feb. 26, 1996, U.S Ser. No: 08/606,865 (Status pending); which is a continuationin-part of applicant's prior pending application: "TOTAL POWER SOLUTION" U.S Ser. No: 08/448,992 filed May 24, 1995 (status pending); which is a continuation-in-part of applicant's prior pending application: NO-BLO-FUSE FOR PROTECTING, MONITORING, AND MANAGING AN AC/DC ELECTRICAL LINE OR A TELECOMMUNICATION LINE USING A MICROPROCESSOR (NBF-II) U.S. Pat. No. 5,440,441 issued: Aug. 8, 1995, U.S Ser. No: 08/138,742 filed Oct. 18, 1993, which is a continuation-in-part of applicant's prior pending application: "POWER LINE PROTECTOR, MONITOR AND MANAGEMENT SYSTEM" (PMS-II) U.S. Pat. No. 5,428,494 U.S Ser. No. 08/008,674, filed Jan. 25, 1993, which is a continuation-in-part of applicant's prior application: "POWER LINE PROTECTOR, MONITOR AND MANAGEMENT SYSTEM" U.S Ser. No. 07/684,167, filed Apr. 11, 1991, (abandoned, which is a continuation-in-part of applicant's prior pending application: "AUTO RESET CIRCUIT BREAKER" (NO-BLO-FUSE) U.S. Ser. No. 06/833,360, filed Feb. 25, 1986, (U.S. Pat. No. : 5,388,022), which is a continuation-in-part of the applicant's prior application "OVER-CURRENT/OVER-VOLTAGE NO-BLO PROTECTION DEVICE" U.S. Ser. No. 06/664,472, filed Oct. 10, 1984, abandoned, additionally a PCT patent application filed from the '472 application issued as patents in Europe: Patent No. 0204723 B1 issued May 8, 1991, and Canada: Patent No. 1291207 issued Oct. 22, 1991.

This present application incorporates by reference these above stated patents and patent applications and further includes and incorporates by reference these following of applicant's U.S. patents/applications: Ser. No. 07/011,049 filed Feb. 5, 1987, (abandoned), which is a continuation-in-part of applicant's application: "POLARITY RING DIRECTOR" U.S Pat. No. 4,669,111 issued May 26, 1987, which is a continuation in part of applicant's prior application U.S. Ser. No. 633,107 filed Jul. 20, 1984, abandoned; U.S. Pat. No. 4,653,084 issued Mar. 24, 1987, "REMOTE ACTUATED SWITCH" and U.S. Pat. No. 4,700,380 issued Oct. 13, 1987, "SOLID STATE REMOTE ACTUABLE SWITCH"; U.S. Pat. No. 4,710,949 issued Dec. 1, 1987, "TELEPHONE LINE FAULT LOCATING DEVICE"; U.S. Pat. No. 4,669,111 issued May 26, 1987 "POLARITY RING DIRECTOR", and U.S. Pat. No. 4,771,451 issued Sep. 13, 1988 "POLARITY RING DIRECTOR"; and U.S. Pat. No. 4,675,899 issued Jun. 23, 1987, "FREQUENCY RING DIRECTOR"; U.S. Pat. No. 4,669,112 issued May 26, 1987, "AUTOMATIC TELEPHONE NUMBER INDICATING DEVICE".

FIELD OF THE INVENTION

The present invention generally relates to surge protection systems, and surge protectors for use in AC or DC circuits.

BACKGROUND OF THE INVENTION

Telephone line and power line surge and lightning protection has been described in applicant's prior patents and applications as listed in the cross reference above. Additionally several single telephone line and multi party line devices have been disclosed in applicants prior patents also as listed above and as follows:

U.S. Pat. No. 4,653,084 issued Mar. 24, 1987, "REMOTE ACTUATED SWITCH" (RAS) and U.S. Pat. No. 4,700,380 issued Oct. 13, 1987, "SOLID STATE REMOTE ACTUABLE SWITCH" (SSS) relate to remotely ACTUABLE solid state switches useable as solid state switches in the present invention as building blocks, for isolating and for bridging telephone lines for the purposes of routing, managing the calls and/or testing the telephone line(s).

U.S. Pat. No. 4,710,949 issued Dec. 1, 1987, "TELEPHONE LINE FAULT LOCATING DEVICE" relates to the metallic testing of a telephone line, also called as the "Maintenance Termination Unit" (MTU) in the industry.

U.S. Pat. No. 4,669,111 issued May 26, 1987 "POLARITY RING DIRECTOR" (PRD), and U.S. Pat. No. 4,771,451 issued Sep. 13, 1988 "POLARITY RING DIRECTOR" (PRD); and U.S. Pat. No. 4,675,899 issued Jun. 23, 1987, "FREQUENCY RING DIRECTOR" (FRD); relate to the directing of incoming calls at the subscriber end of a multi-party telephone line.

U.S. Pat. No. 4,669,112 issued May 26, 1987, "AUTOMATIC TELEPHONE NUMBER INDICATING DEVICE" (ANI), provides a metallic (analog) indication i.e. identifies a calling party to the central office equipment for billing purposes in a party line environment.

Many surge and lightning protection products are currently available on the market today but none of them provide reliable surge and lightning protection above and beyond, providing one to three MOVs, and except perhaps warn you by way of a little light or a buzzer indicating that the MOV has failed, and that now you are without surge and lightning protection. Thus these sacrificial devices leave you without protection when you need them most. None of them are designed to protect the equipment to be protected and unit itself so that it takes advantage of a solid state switch or an electromechanical switch as an inexpensive fault tolerant isolation means to provide an improved surge and lightning protection.

Then there are those that provide stacks of transient voltage suppressors (TSV) at a very high price, such that they cost much more than the basic electronic equipment to be protected, such as the micro-wave oven, TVs and stereo systems, etc.

The present invention provides the following advantages over the devices currently available in the market:

1) Even though relatively inexpensive, and it provides continued superior quality surge and lightning protection.
2) It is designed to provide continuous usage and protection as compared to other products that leave the equipment unprotected, (and at best only indicate or inform the user that it has failed and is no longer protecting your equipment. They are designed to be thrown away.)
3) It additionally provides continuous over-voltage protection, providing isolation for the equipment or the protected line from the source until the over-voltage condition has subsided;
4) Eliminates the serious problem of leaving the equipment without protection, just when the protection is needed the most, as in the situation of surges, lightning and thunder storm conditions.
5) It is easy to maintain and restore back into service.

More expensive and complete systems including, Power Line Protection, Management and Monitoring, Noise Filtering and secure Surge and Lightning Protection including secure Multiple Stage Protection and Noise Filtering, various ways of incorporating new and innovative Power Supplies and managing the business and home environment via communications links including numerous means of switching and isolating the load from the line have already been discussed in the family of referenced US Patents and Patents pending.

The present invention is described more particularly in the summary and the detailed description as follows:

SUMMARY OF THE INVENTION

In accordance with the present invention the Basic Surge Protector is based on a very low cost approach in that it is cheaper to replace a (50 to a 100 mA) fuse than to throw away the whole surge protector, or worse still to lose the equipment, that one thought was being protected. (However it has been foreseen that for a slight additional cost, a resetable circuit breaker will eliminate the inconvenience and need of the fuse to be replaced.)

The second principle adopted in the Basic Surge Protector is that the system automatically shuts off the flows of current to the equipment to be protected by deactivating a (Uni-lateral/Bi-lateral) solid state switch, or an electromechanical relay means, when a serious surge, transient or lightning presents itself and would otherwise endanger the integrity of the surge protector and the equipment.

The present invention is particularly applicable and useful for a wide variety of electrical applications where surge and lightning protection is needed at a relatively low cost and is fully functional providing superior protection.

The AC circuit version is particularly applicable to household and industrial application, where a Basic Surge Protector is much more desired over a more serious and ultra reliable surge and lightening protection system as described in applicant's prior disclosures, that are rather cost prohibitive for the application.

The DC circuit version is particularly applicable to automotive applications and industrial power supplies for computers and other voltage sensitive DC circuits.

The AC-DC circuits are particularly useful for the telecommunications industry, and power companies as surge protectors used to protect telecommunication lines and AC lines against lightning surges or other uncontrolled voltages.

BRIEF DESCRIPTION OF THE DRAWINGS

FIG. 2b illustrates the Basic Surge Protector using a Solid State Switch and transient voltage suppressors.

FIG. 2c illustrates the Basic Surge Protector using a Solid State Switch and transient voltage suppressors, but further illustrates integration of the device on a monolithic chip.

FIG. 2d illustrates the Basic Surge Protector using a Solid State Switch and transient voltage suppressors, but further illustrates integration of the device on monolithic chip, and a crowbar circuit to insure that the fuse will blow when the voltage on the line exceeds a prescribed limit.

DETAILED DESCRIPTION OF THE PREFERRED EMBODIMENTS

Figure 1B:
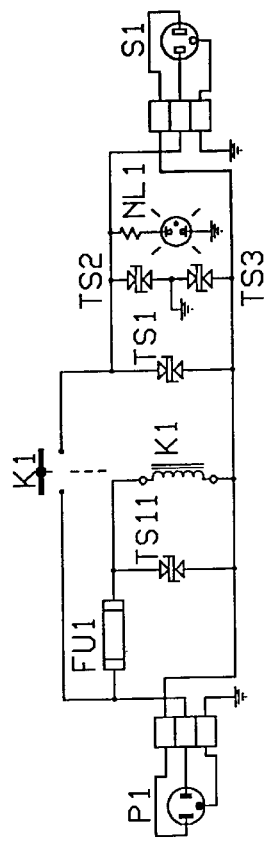
FIG. 1b illustrates the Basic Surge Protector as in FIG. 1 using transient voltage suppressors.
Figure 1:
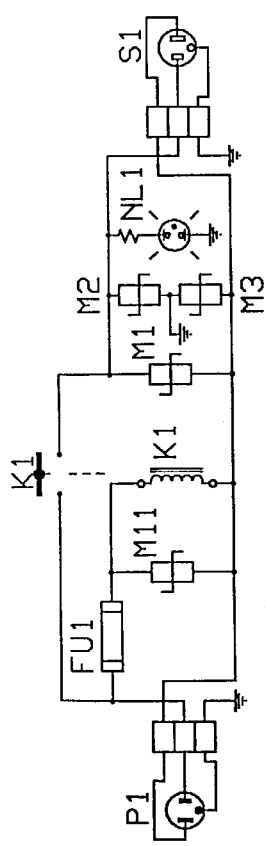
FIG. 1 illustrates the Basic Surge Protector using an elctromechanical relay and MOVs.

FIG. 1 illustrates the Basic Surge Protector using an elctromechanical relay K1 and MOVs M1, M2 and M3 as secondary Surge and Transient Voltage protectors. The components FU1, M11 and K1 are the key components of this invention in its very Basic form as a Basic Surge Protection. By design the breakdown voltage of the MOV M11 would be less than M1. Thus when a surge or transient voltage in excess of a predetermined value is detected by M11, it goes into heavy conduction causing the fuse F1 to blow. This disables the relay/Contactor K1 thus sparing the entire system of the potential damage that would otherwise be caused by the surge. Just by replacing the blown fuse the system would be back in operation again.

FIG. 1b illustrates the Basic Surge Protector as in FIG. 1 using Transient Voltage Suppressors. These devices provide sub-nano second response time and provide a sharper cleaner protection to the load being protected.

Figure 2:
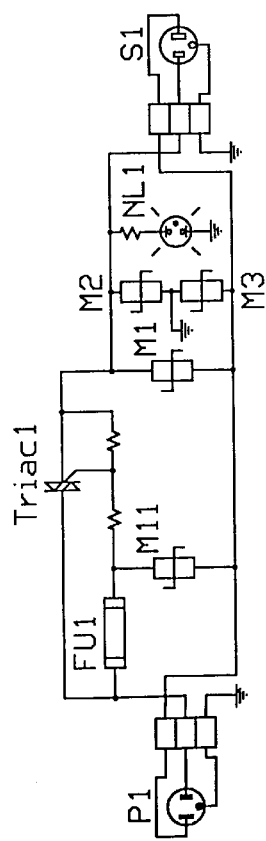
FIG. 2 illustrates the Basic Surge Protector using a Solid State Switch and MOVs.

FIG. 2 illustrates the Basic Surge Protector using a Solid State Switch and MOVs. The relay/Contactor of FIG. 1 has been replaced with a Solid State Switch. The solid state switch of the present invention may be a triac, an SCR, or a pair of complimentary (p & n or n & n) field effect transistors, as illustrated in applicant's prior patents.

FIG. 2b illustrates the Basic Surge Protector using a Solid State Switch and Transient Voltage Suppressors. Thus providing an over-all faster response.

FIG. 2c illustrates the Basic Surge Protector using a Solid State Switch and Transient Voltage Suppressors, but further illustrates the possibility of integration of the device on a monolithic chip. The block 100 represents the secondary surge protector that my be rendered in various different ways as illustrated in applicant's prior patents, i.e. using various diode bridge circuits. This bloc may be independently integrated or be integrated together with the block 110 in the figure which represent the Solid State Switch and protection means. Again The Solid State Switch may be an ac or dc or an ac/dc switch depending on the application. These switches have also been adequately illustrated in prior patents. Additionally a fuse F2 has been integrated in the monolithic device to insure absolute protection of the ratings of the system. In the event fuse Fi is improperly replaced by a user of the device F2 insures that it will blow and save the user's equipment connected to the load side of the Basic Surge Protector.

Additionally the first, second and third transient voltage surge Suppressors electrically connected across the load-side phase and neutral terminals, phase and ground terminals and neutral and ground terminals are designed to afford a low cost solution to provide continuous and reliable surge and transient voltage suppression and protection.

FIG. 2d illustrates the Basic Surge Protector using a Solid State Switch and Transient Voltage Suppressors, but further illustrates integration of the device on monolithic chip, and a crowbar circuit that goes into heavy conduction to insure that the fuse will blow when the voltage on the line exceeds a prescribed limit.

Figure 3:
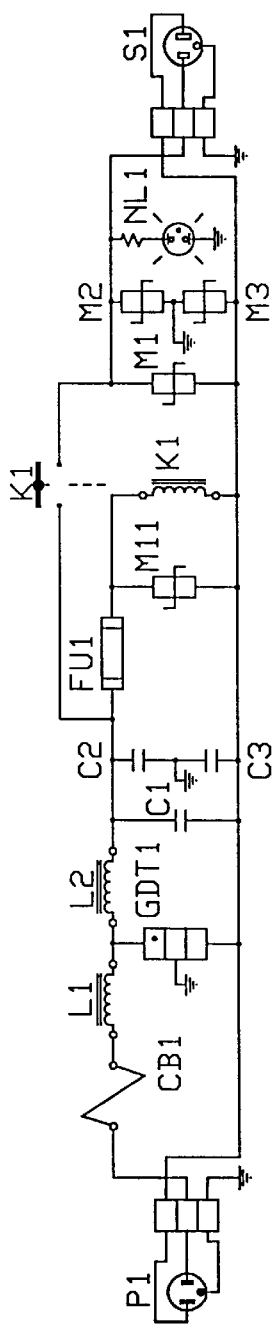
FIG. 3 illustrates the Basic Surge Protector using an elctromechanical relay and MOVs of FIG. 1, and further includes other peripherals to enhance its performance.

FIG. 3 illustrates the Basic Surge Protector using an elctromechanical relay and MOVs of FIG. 1, and further includes other peripherals to enhance its performance. By adding a primary surge protector and a noise filter on the front end and additionally a circuit breaker means the integrity of the system is further preserved.

Figure 3B:
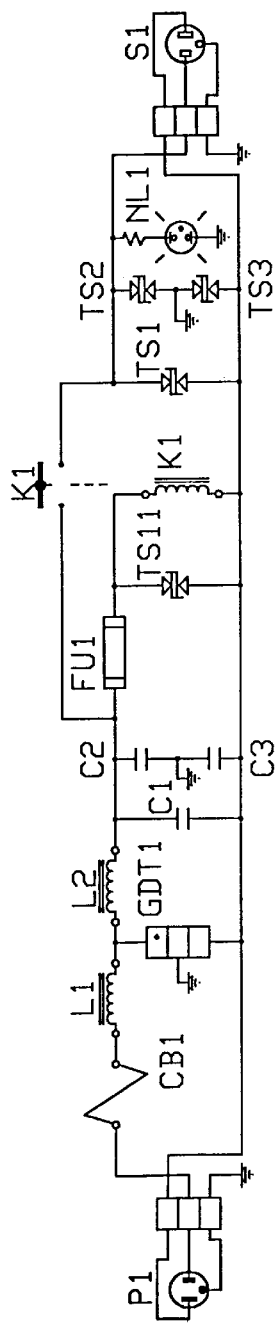
FIG. 3b illustrates the Basic Surge Protector using an elctromechanical relay and Transient Voltage Suppressors of FIG. 1b, and further includes other peripherals to enhance its performance.

FIG. 3b illustrates the Basic Surge Protector using an electromechanical relay and Transient Voltage Suppressors of FIG. 1b, and further includes other peripherals to enhance its performance as in FIG. 3. Thus the Basic Surge Protector of the present invention may also be used in combination with a high voltage and current primary protection device which is mounted between the line to be protected and earthground, with the primary protection device connected in front of the solid state switch. A transient voltage suppressor may also be mounted between each of the line to be protected and ground with the transient suppressor connected behind the solid state switch. In addition, the Basic Surge Protector of the present invention may be connected in a multi-line environment to provide over-current protection between each of the lines and between each of the lines and ground.

Figure 4:
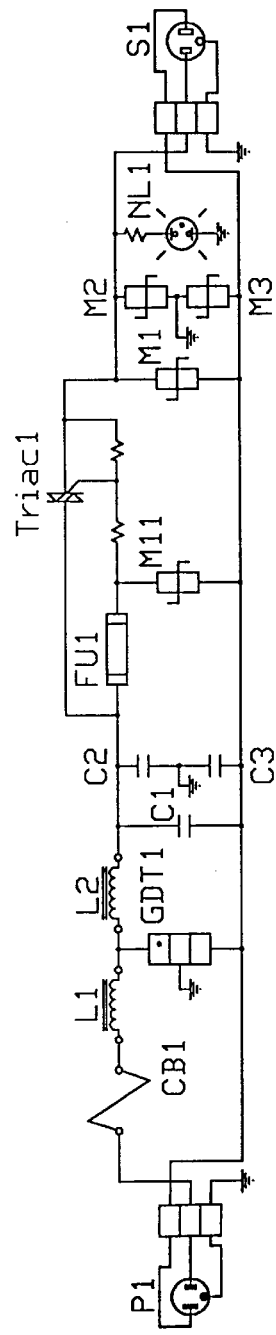
FIGS. 4 and 4b are the same as FIGS. 3 and 3b while using a Solid State Switch instead of an electromechanical relay (Contactor, or switch means).
Figure 4B:
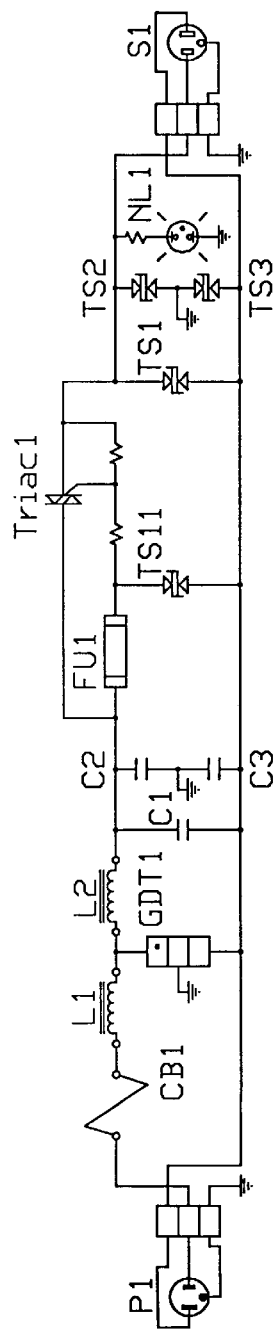

FIGS. 4 and 4b are the same as FIGS. 3 and 3b while using a Solid State Switch instead of an electromechanical relay (Contactor, or switch means).

Figure 5:
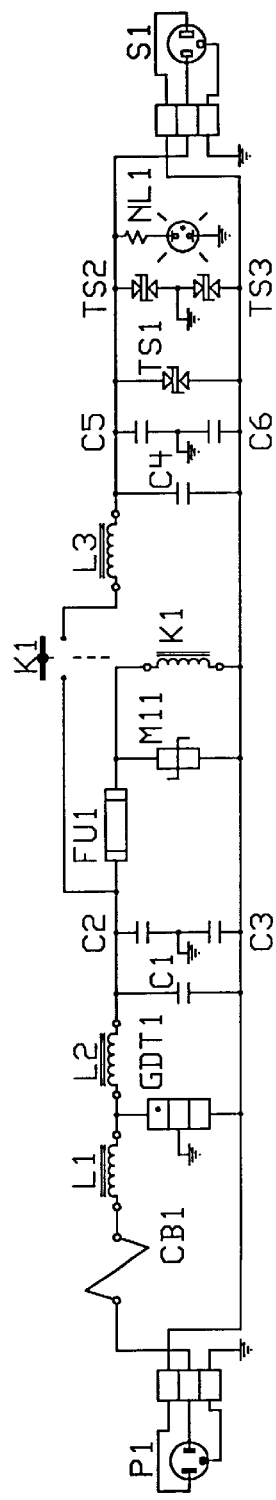
FIGS. 5 and 5b provide further stages of noise filtration in the Basic Surge Protectors illustrated to this point.
Figure 5B:
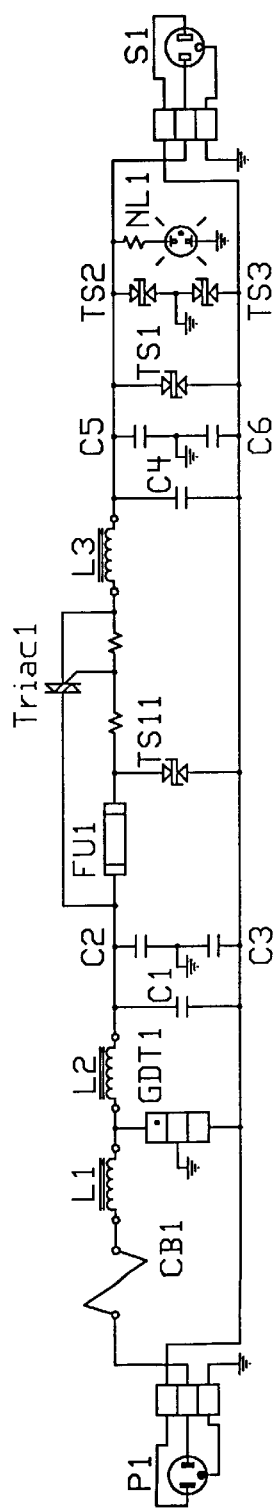

FIGS. 5 and 5b provide further stages of noise filtration by including L3, C4, C5 and C6 in the circuit as in the Basic Surge Protectors illustrated to this point.

Figure 6:
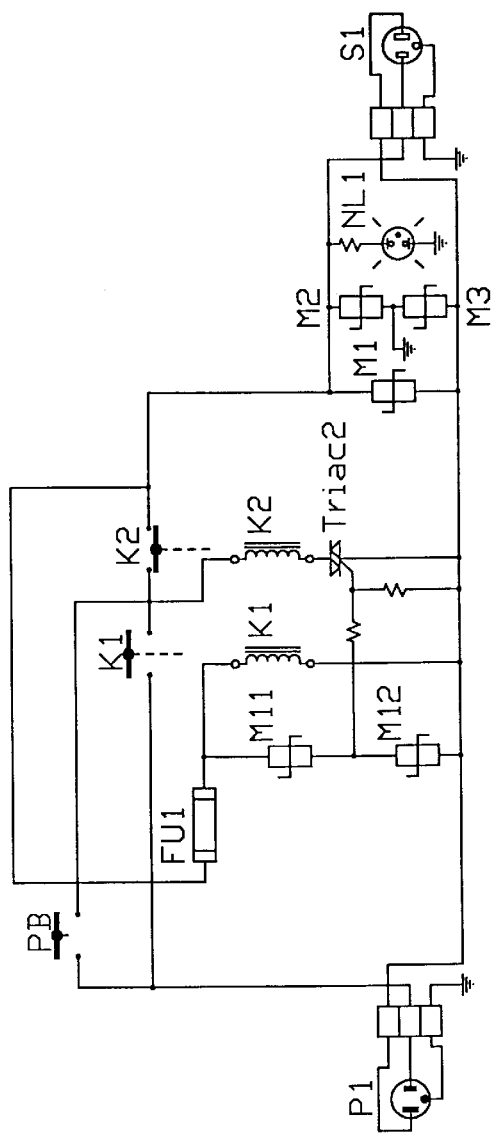
FIG. 6 illustrates is an electro mechanical Basic Surge Protector of FIG. 1, which resets upon detecting a surge condition, and may be manually reset or automatically set to the ON position again by depressing a Push Button.

FIG. 6 illustrates is an electro mechanical Basic Surge Protector of FIG. 1, which resets upon detecting a surge condition, and may be manually reset or automatically set to the ON position again by depressing a Push Button. Upon the detection of a flow of a fault current Triac 2 energizes relay K2 and shuts off the system. The push button my be locked in an on position and a delay interval added to the relay K2 will toggle it intermittently until the surge/over voltage condition no longer exists on the line. Thus in the locked in position it will automatically restore to normally ON position.

Figure 7:
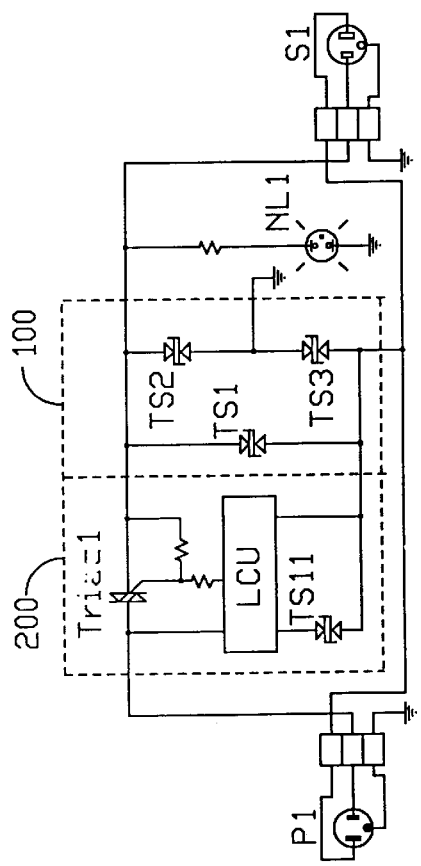
FIG. 7 illustrates an monolithic version of this invention where in the Solid State Switch and the control and protection are on a single chip.

FIG. 7 illustrates an monolithic version of this invention wherein the Solid State Switch and the control and protection are on a single chip. As stated earlier the protection block 100 may be integrated onto the single chip or may be produced separately. The logic control unit in block 200 controls the Solid State Switch of the system and upon detecting any over-voltage on the line it turns of the Solid State Switch and with a delay, and upon the return of the line voltage to its normal conditions it resumes the system to normally ON. An additional input to the device will allow it to stay OFF after a surge condition, until the switch (not shown) is depressed again (manual operation).

In Summary many principles, modifications, versions and variations have been presented in the foregoing disclosure in order to illustrate the different elements of a Basic Surge Protector of the present invention. Even if some of the individual elements are known and understood in the prior art, what is presented here are several complete and unique stand alone workable systems that provide maximum performance, reliability and cost to benefit ratio including the preferred embodiments.

I claim:

1. A Basic Surge Protector comprising a line side and a load side, for protecting an electrical or an electronic equipment connected to said load side of the Surge Protector, from spurious or excessive transient voltages or surges or both on said line side of the Surge Protector, that are above a predetermined value, on said line side of the Surge Protector, the Surge Protector further comprising:

(a) at least one switch means series mounted between said line side and said equipment on said load side, wherein said switch means is responsive to a signal that allows or interrupts a flow of current through said switch means, to said equipment on said load side of the Surge Protector, thus isolating said equipment from the transients and surges on said line side of the Surge Protector;

(b) at least one fuse means or a current responsive means connected to a hot or a positive line of said line side of the Surge Protector and a threshold point, wherein said fuse means or said current responsive means responds to a fault condition that exceeds said predetermined value, due to a surge voltage or current into at least one over voltage detection or suppression means connected across said threshold point and a earth ground or across said threshold point and a return line or a neutral line on said line side of the Surge Protector, (c) wherein said threshold point is further connected to said switch means, and disables said switch means, thus disabling the flow of current flowing through said switch means to said equipment on said load side, when said fuse means or said current responsive means blows or disengages for a predetermined period, due to said surge voltage or current exceeding said predetermined value.

2. A Basic Surge Protector for protecting an electrical equipment as claimed in claim 1, wherein said switch means is an electromechanical device.

3. A Basic Surge Protector for protecting an electrical equipment as claimed in claim 1, wherein said switch means is a solid-state switch means.

4. A Basic Surge Protector for protecting an electrical equipment as claimed in claim 1, wherein said fuse means or said current responsive means is an auto-resettable or a manually resettable, mechanical or electromechanical circuit-breaker.

5. A Basic Surge Protector for protecting an electrical equipment as claimed in claim 1, wherein the Surge Protector is a monolithic or a hybrid integrated circuit.

6. A Basic Surge Protector for protecting an electrical equipment as claimed in claim 1, wherein said over voltage detection or suppression means is a Metal Oxide Varistor.

7. A Basic Surge Protector for protecting an electrical equipment as claimed in claim 1, wherein said over voltage detection or suppression means is a Transient Voltage Suppressor.

8. A Basic Surge Protector for protecting an electrical equipment as claimed in claim 1, wherein the Surge Protector is adapted to an AC circuit, or a DC circuit, or an AC and DC circuit.

9. A Basic Surge Protector for protecting an electrical equipment as claimed in claim 1, wherein the Surge Protector further includes an indicator connected across said load side and said earth ground to indicate a presence of power and proper ground across said equipment.

10. A Basic Surge Protector for protecting an electrical equipment as claimed in claim 1, wherein at least one supplemental primary protection device is connected across said line side hot or positive line and said earth ground, or neutral line or across both on said line side of said switch means.

11. A Basic Surge Protector for protecting an electrical equipment as claimed in claim 10, wherein said supplemental primary protection device is at least a two element gas discharge tube.

12. A Basic Surge Protector for protecting an electrical equipment as claimed in claim 1, wherein said fuse means or said current responsive means is a self-resetting or manually resettable solid-state circuit-breaker.

13. A Basic Surge Protector for protecting an electrical equipment as claimed in claim 12, where in the Surge Protector is a monolithic or a hybrid integrated circuit.

14. A Basic Surge Protector for protecting an electrical equipment as claimed in claim 13, wherein the Surge Protector is a monolithic or a hybrid integrated circuit, and further includes a logic control unit.

15. A Basic Surge Protector for protecting an electrical equipment as claimed in claim 1, wherein at least one supplemental secondary protection device is connected across said load side of the Surge Protector, across hot or positive line and said earth ground, or neutral line or across both on said load side of said switch means.

16. A Basic Surge Protector for protecting an electrical equipment as claimed in claim 15, wherein said supplemental secondary protection device is a metal oxide Varistor, or a transient voltage suppressor or any hybrid over-voltage protector means.

17. A Basic Surge Protector for protecting an electrical equipment as claimed in claim 16, where in the Surge Protector is a monolithic or a hybrid integrated circuit.

18. A Basic Surge Protector for protecting an electrical equipment as claimed in claim 16, where in the Surge Protector is a monolithic or a hybrid integrated circuit, and further includes a logic control unit.

19. A Basic Surge Protector comprising a line side and a load side, for protecting an electrical or an electronic equipment connected to said load side of the Surge Protector, from spurious or excessive transient voltages or surges or both on said line side of the Surge Protector, that are above a predetermined value, on said line side of the Surge Protector, the Surge Protector further comprising:

(a) at least one switch means series mounted between said line side and said equipment on said load side wherein said switch means is responsive to a signal that allows or interrupts a flow of current through said switch means, to said equipment on said load side of the Surge Protector, thus isolating said equipment from the transients and surges on said line side of the Surge Protector;

(b) at least one fuse means or a current responsive means connected to a first line on said line side of the Surge Protector and a threshold point, wherein said fuse means or said current responsive means responds to a fault condition that exceeds said predetermined value, due to a surge voltage or current into at least one over voltage detection or suppression means connected across said threshold point and a second line on said line side of the Surge Protector, (c) wherein said threshold point is further connected to said switch means, and disables said switch means, thus disabling the flow of current flowing through said switch means to said equipment on said load side, when said fuse means or said current responsive means blows or disengages for a predetermined period, due to said surge voltage or current exceeding said predetermined value.

20. A Basic Surge Protector for protecting an electrical equipment as claimed in claim 19, wherein at least one supplemental secondary protection device is connected across a first line and across a second line on said load side of said switch means; or wherein at least one supplemental primary protection device is connected across said first line and across said second line on said line side of said switch means; or wherein at least one supplemental primary protection device is connected across said first line and across said second line on said line side of said switch means and wherein at least one supplemental secondary protection device is connected across said first line and across said second line on said load side of said switch means; wherein said Basic Surge Protector is further made with discrete components, or is a hybrid integrated circuit or a monolithic integrated circuit.

* * * * *